(12) United States Patent
Childress et al.

(10) Patent No.: US 7,747,736 B2
(45) Date of Patent: Jun. 29, 2010

(54) RULE AND POLICY PROMOTION WITHIN A POLICY HIERARCHY

(75) Inventors: Rhonda L. Childress, Austin, TX (US); Itzhack Goldberg, Hadera (IL); Lorraine M. Herger, Port Chester, NY (US); Ziv Rafalovich, Yokneam Illit (IL); Ramakrishnan Rajamony, Austin, TX (US); Eric Van Hensbergen, Austin, TX (US); Martin J. Tross, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/422,239

(22) Filed: Jun. 5, 2006

(65) Prior Publication Data
US 2007/0282986 A1 Dec. 6, 2007

(51) Int. Cl.
G06F 3/06 (2006.01)
G06F 7/04 (2006.01)
G06F 9/44 (2006.01)
G06F 15/16 (2006.01)
G06F 15/173 (2006.01)
G06F 15/177 (2006.01)
G06F 17/00 (2006.01)
G06F 17/30 (2006.01)
G06F 17/50 (2006.01)
H04L 29/06 (2006.01)

(52) U.S. Cl. .......................... 709/224; 705/7; 709/221; 709/223; 709/225; 709/244; 715/733; 717/117; 726/1; 726/6

(58) Field of Classification Search .................. 709/224, 709/221, 223, 225, 244; 705/1; 715/733; 717/117; 726/1, 3
See application file for complete search history.

(56) References Cited

U.S. PATENT DOCUMENTS

| 5,797,128 | A | * | 8/1998 | Birnbaum | 707/5 |
| 5,809,492 | A | * | 9/1998 | Murray et al. | 706/45 |
| 5,889,953 | A | * | 3/1999 | Thebaut et al. | 709/221 |
| 5,907,844 | A | * | 5/1999 | Guay et al. | 707/100 |
| 6,327,618 | B1 | * | 12/2001 | Ahlstrom et al. | 709/223 |
| 6,381,639 | B1 | * | 4/2002 | Thebaut et al. | 709/222 |

(Continued)

OTHER PUBLICATIONS

"ManageSite SE 1.1 for Blade Server" Amphus, Inc., 2002, pp. 1-2.

(Continued)

*Primary Examiner*—Tonia L Dollinger
*Assistant Examiner*—Daniel C Murray
(74) *Attorney, Agent, or Firm*—Yee & Associates, P.C.; Libby Z. Toub

(57) ABSTRACT

A computer implemented method, data processing system, and computer program product for nominating rules or policies for promotion through a policy hierarchy. An administrator at any level in a policy hierarchy may create a rule or policy. The administrator may then nominate the rule or policy for inclusion in a next higher level in the policy hierarchy. The rule or policy is evaluated at the next higher level. Responsive to an approval of the next higher level to include the rule or policy in the jurisdiction of the next higher level, the rule of policy is provided to all users under the jurisdiction. The nominating, evaluating, and providing steps may then be repeated for each higher level in the policy hierarchy.

16 Claims, 9 Drawing Sheets

U.S. PATENT DOCUMENTS

| | | | |
|---|---|---|---|
| 6,466,932 B1 * | 10/2002 | Dennis et al. | 707/3 |
| 6,484,261 B1 * | 11/2002 | Wiegel | 726/11 |
| 6,556,985 B1 * | 4/2003 | Karch | 707/2 |
| 6,785,728 B1 * | 8/2004 | Schneider et al. | 709/229 |
| 6,826,698 B1 * | 11/2004 | Minkin et al. | 709/225 |
| 6,880,005 B1 * | 4/2005 | Bell et al. | 726/1 |
| 6,950,825 B2 * | 9/2005 | Chang et al. | 707/100 |
| 7,013,332 B2 * | 3/2006 | Friedel et al. | 709/223 |
| 7,065,745 B2 * | 6/2006 | Chan | 717/117 |
| 7,171,659 B2 | 1/2007 | Becker et al. | |
| 7,203,744 B1 * | 4/2007 | Parekh et al. | 709/223 |
| 7,350,226 B2 * | 3/2008 | Moriconi et al. | 726/1 |
| 7,461,395 B2 * | 12/2008 | Ng | 726/1 |
| 7,519,600 B1 | 4/2009 | Zenz | |
| 7,584,467 B2 | 9/2009 | Wickham et al. | |
| 2002/0016840 A1 * | 2/2002 | Herzog et al. | 709/225 |
| 2002/0069200 A1 * | 6/2002 | Cooper et al. | 707/9 |
| 2002/0091815 A1 | 7/2002 | Anderson et al. | |
| 2003/0037040 A1 * | 2/2003 | Beadles et al. | 707/1 |
| 2003/0069736 A1 * | 4/2003 | Koubenski et al. | 705/1 |
| 2003/0069737 A1 * | 4/2003 | Koubenski et al. | 705/1 |
| 2003/0115292 A1 * | 6/2003 | Griffin et al. | 709/219 |
| 2004/0103211 A1 * | 5/2004 | Jackson et al. | 709/244 |
| 2004/0117765 A1 * | 6/2004 | Chan | 717/117 |
| 2004/0177139 A1 * | 9/2004 | Schuba et al. | 709/223 |
| 2005/0160411 A1 * | 7/2005 | Sangal et al. | 717/144 |
| 2005/0289401 A1 | 12/2005 | Goin et al. | |
| 2006/0010449 A1 | 1/2006 | Flower et al. | |
| 2006/0225123 A1 * | 10/2006 | Childress et al. | 726/1 |
| 2006/0259604 A1 | 11/2006 | Kotchavi et al. | |
| 2007/0133759 A1 * | 6/2007 | Malik et al. | 379/80 |
| 2007/0282985 A1 | 12/2007 | Childress et al. | |
| 2008/0028029 A1 * | 1/2008 | Hart | 709/206 |
| 2008/0140835 A1 | 6/2008 | Bradley et al. | |

OTHER PUBLICATIONS

"ManageSite SE 1.1 for Blade Server", Amphus, Inc., 2002, pp. 1-2.

USPTO Office Action for U.S. Appl. No. 11/422,225 dated Mar. 23, 2009.

USPTO Final Office Action for U.S. Appl. No. 11/422,225 dated Oct. 15, 2009.

USPTO office action for U.S. Appl. No. 11/422,225 dated Jan. 28, 2010.

* cited by examiner

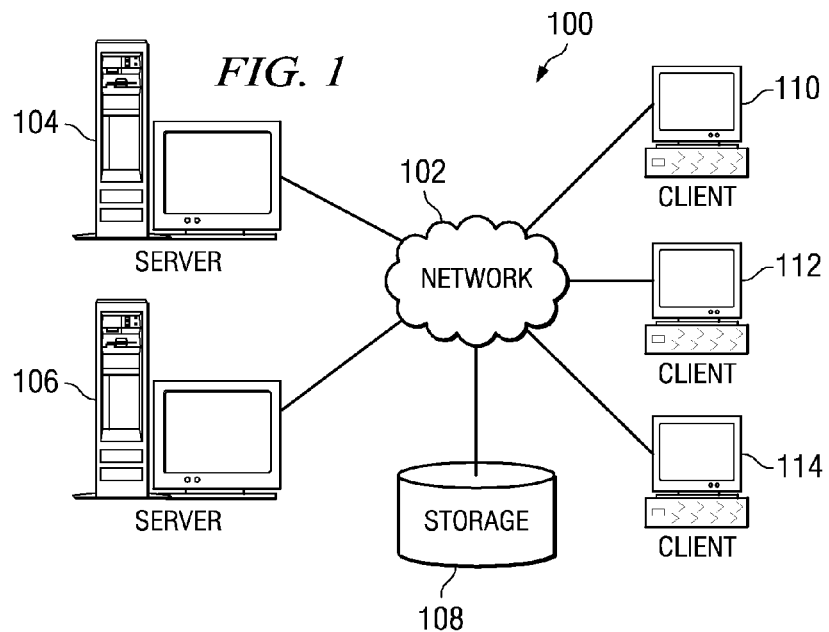
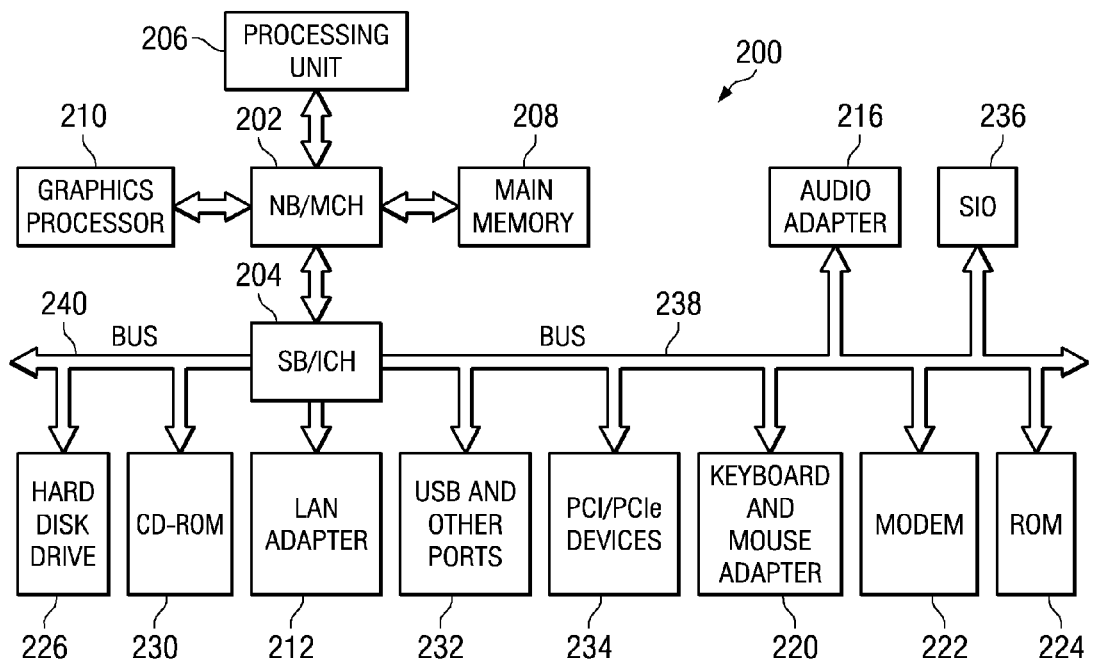

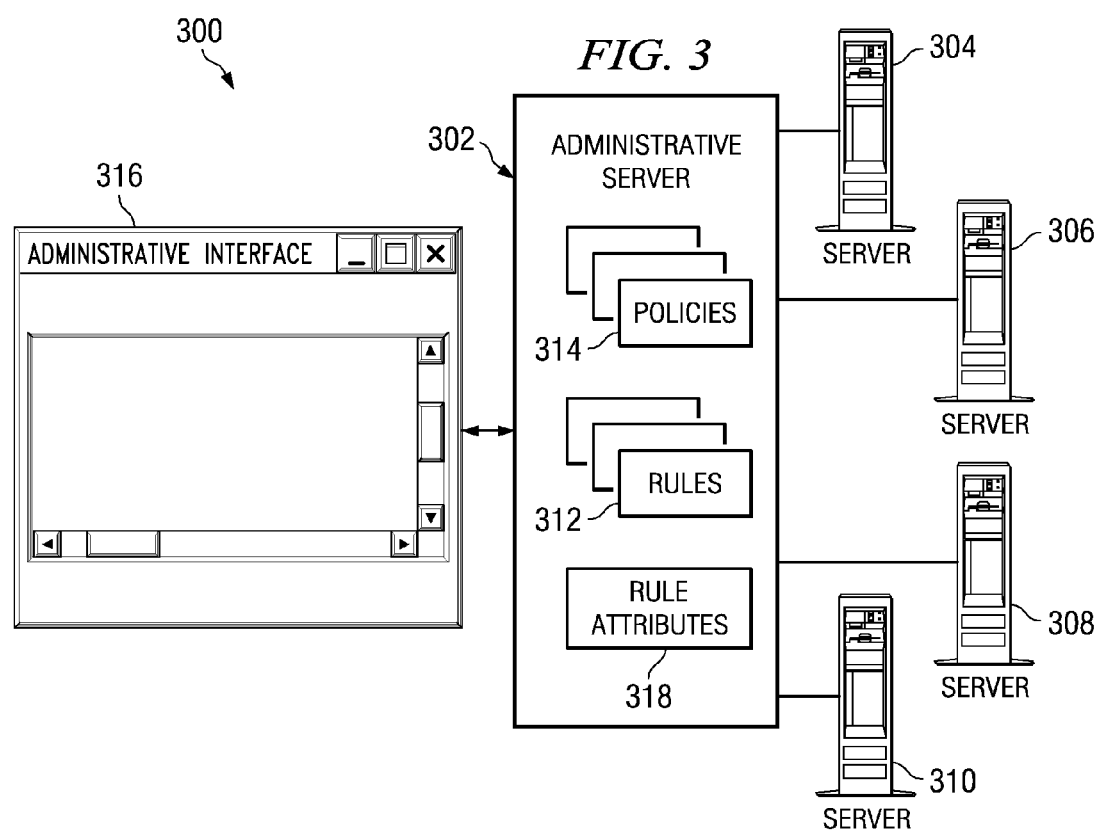

```xml
<?xml version="1.0" encoding="UTF-8"?>
<tns:pnpRule xmlns:tns="http://www.ibm.com/gdrd/PnP-Policy"
    xmlns:xsi="http://www.w3.org/2001/XMLSchema-instance" xsi:schemaLocation=
    "http://www.ibm.com/gdrd/PnP-Policy PnP-Policy.xsd ">
    <name>archiveConfigFiles</name>
    <declaration> Archive files to archive folder. </declaration>
    <description>Enable internal archiving of configuration files.</description>
    <parametersList>
        <parameter>
            <name>ArchiveFileList</name>
            <description>Comma separated list of files to archive</description>
            <defaultValue>/etc/passwd/etc/hosts</defaultValue>
            <isMandatory>true</isMandatory>
            <prefix>-files [ </prefix>
            <postfix> ] </postfix>
        </parameter>
        <parameter>
            <name>HistoryLength</name>
            <description>Number of copies to keep for each file</description>
            <defaultValue>3</defaultValue>
            <isMandatory>false</isMandatory>
            <prefix>-length</prefix>
        </parameter>
    </parametersList>
    <resourcesList>
        <resource>
            <script>
                <name>archive.sh</name>
                <location>/maintenance/archive</location
                <version>2.1</version>
            </script>
        </resource>
    </resourcesList>
</tns:pnpRule>
```

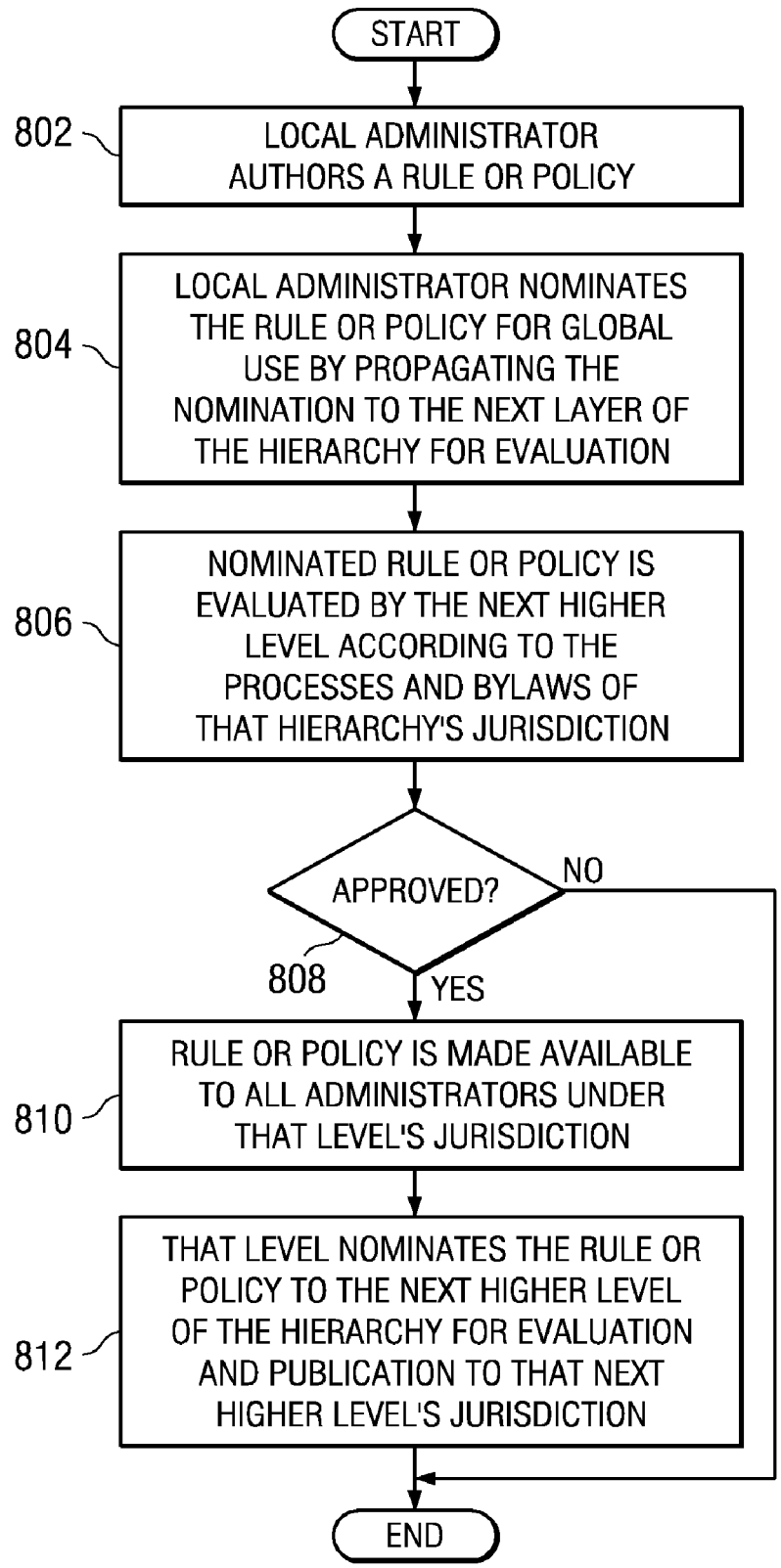

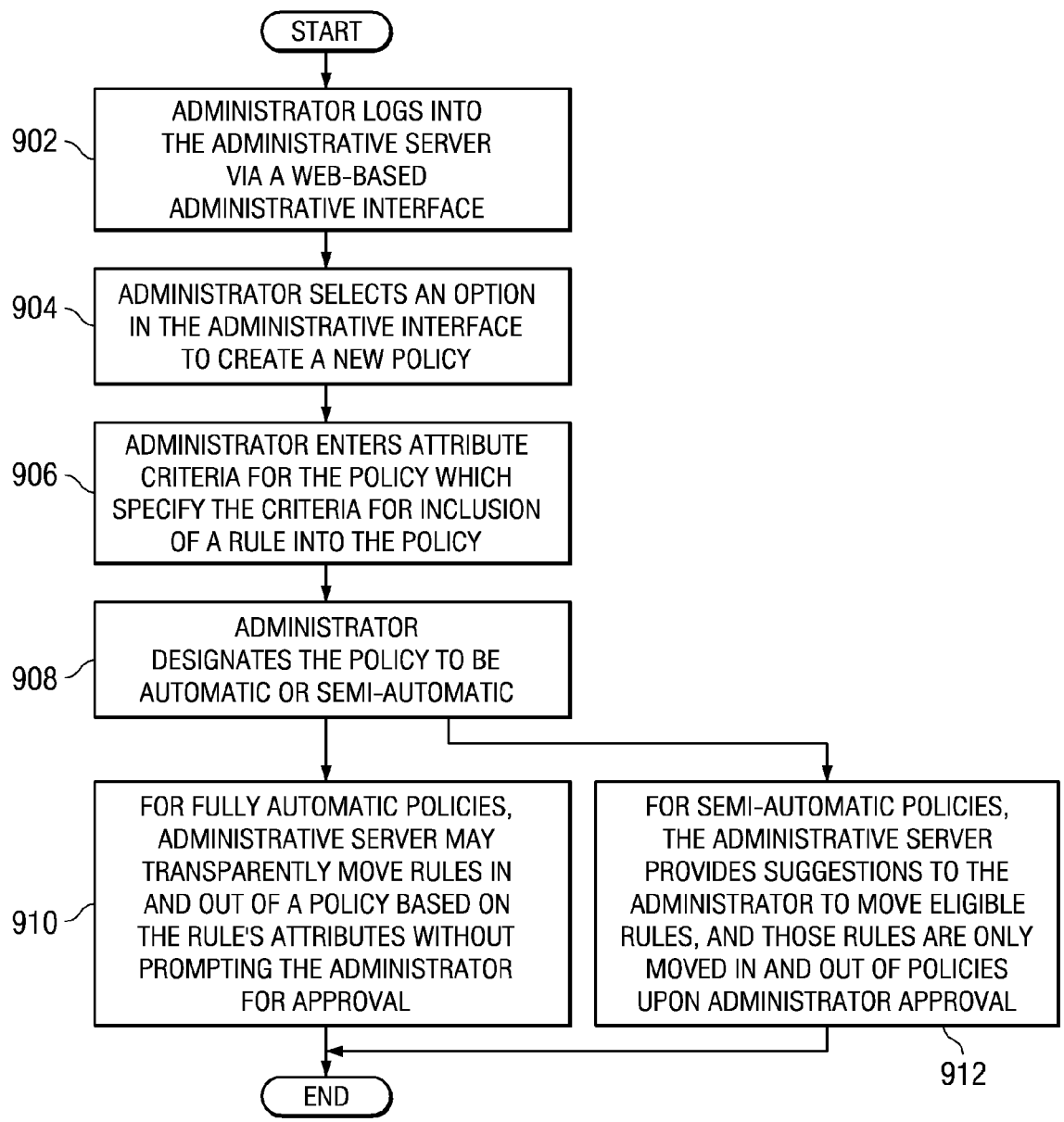

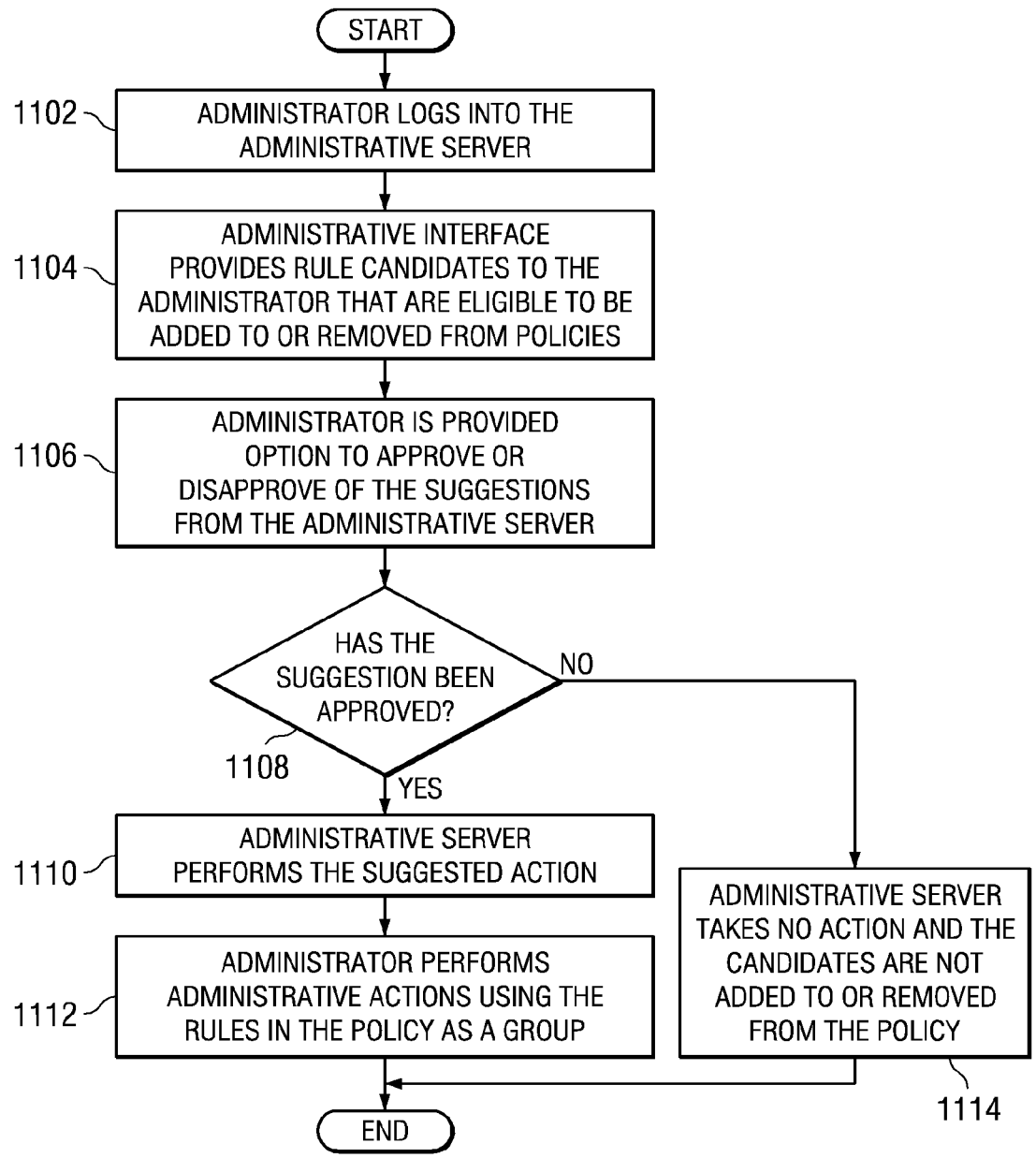

RULE AND POLICY PROMOTION WITHIN A POLICY HIERARCHY

BACKGROUND OF THE INVENTION

1. Field of the Invention

The present invention relates generally to an improved data processing system, and in particular to a computer implemented method, data processing system, and computer program product for nominating rules or policies for promotion through a policy hierarchy.

2. Description of the Related Art

As business needs and infrastructure requirements become more complex, software applications are required to contain more "intelligence" about their surroundings, including knowing how the application should behave and how the application should interact with the infrastructure around it. More importantly, it is necessary that the behavior of an application reflect more of the process flow of the business, and less of the configuration settings of the installer. To address these issues, many existing applications now employ embedded policy engines. Policies are originated at a central authority and are then distributed throughout the lower levels of the enterprise. However, in many situations, rules and policies originate in fixes and optimizations derived by local administrators, who are typically located at the bottom-most layer of the enterprise. A lack of cross-communication among these local administrators, of which there may be thousands in an enterprise across the globe, can result in these changes being isolated. In other words, the local administrators are effectively working in isolation, and thus changes made by one local administrator will not be known by other administrators. Thus, each administrator may end up solving the same problems individually, since there is currently no mechanism for easily sharing policy information from the leaf to the root of the enterprise hierarchy tree.

SUMMARY OF THE INVENTION

The illustrative embodiments provide a computer implemented method, data processing system, and computer program product for nominating rules or policies for promotion through a policy hierarchy. An administrator at any level in a policy hierarchy may create a rule or policy. The administrator may then nominate the rule or policy for inclusion in a next higher level in the policy hierarchy. The rule or policy is evaluated at the next higher level. Responsive to an approval of the next higher level to include the rule or policy in the jurisdiction of the next higher level, the rule of policy is provided to all users under the jurisdiction. The nominating, evaluating, and providing steps may then be repeated for each higher level in the policy hierarchy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a distributed data processing system in which the illustrative embodiments may be implemented;

FIG. 2 is a block diagram of a data processing system in which the illustrative embodiments may be implemented;

FIG. 3 is a block diagram comprising exemplary components used for managing policies in accordance with the illustrative embodiments;

FIG. 7 illustrates a sample extensible markup language (XML) file defining rule elements and their corresponding values in accordance with the illustrative embodiments;

FIG. 8 is a flowchart of a process for policy-based management of resources in a service delivery environment in accordance with the illustrative embodiments;

FIG. 9 is a flowchart of a process for aggregating rules into policies in accordance with the illustrative embodiments;

FIG. 11 is a flowchart of a process for semi-automatically aggregating rules into policies in accordance with the illustrative embodiments.

DETAILED DESCRIPTION OF THE PREFERRED EMBODIMENT

Figure 4:
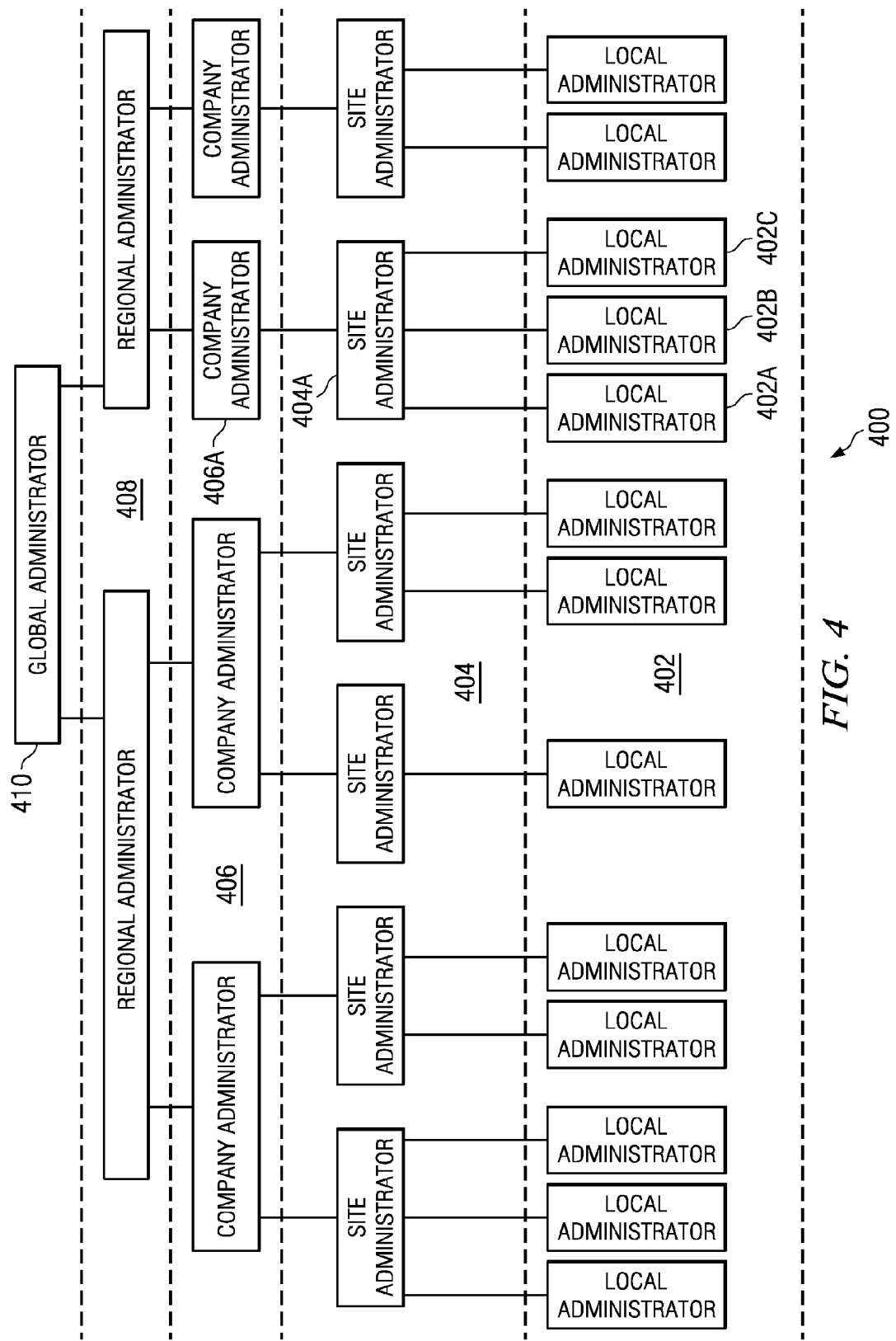
FIG. 4 is a diagram illustrating an exemplary hierarchy through which rules and polices are nominated for promotion in accordance with the illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs and may also include a cache. The depicted examples in FIGS. 1-2 and above-described examples are not meant to imply architectural limitations. For example, data processing system 200 also may be a tablet computer, laptop computer, or telephone device in addition to taking the form of a PDA.

In existing systems, when a local administrator identifies and isolates a problem, the local administrator applies a fix locally on a single server. For an enterprise such as a service delivery center comprising many administrators across the globe, changes made by one local administrator may not be known by other administrators. As a result, each administrator may end up solving the same problem individually across the enterprise.

To address the issue above, the illustrative embodiments provide a policy management system which allows policies developed by local administrators at any level in a policy hierarchy to be propagated throughout the hierarchy. An administrator may include any administrators of computerized systems, such as system administrators, database administrators, web server administrators, and the like. A policy is a set of rules, with each rule being a defined behavior of a server. A rule may be associated with zero, one, or more policies. A policy hierarchy is a structure that organizes rules and provides jurisdictional authority based on levels within the hierarchy.

Using the policy management system described in the illustrative embodiments, when a local administrator isolates a problem and develops a fix in the form of a rule or policy, the administrator applies the fix locally on a server. However, if the local administrator determines that the rule or policy may be useful to other areas in the enterprise, the administrator may nominate the policy for a global use. By nominating the rule or policy for global use, the rule or policy is automatically made visible to the next higher level of the hierarchy.

When the nominated rule or policy is provided to the next higher level, the administrator at that level reviews and evaluates the rule or policy. The evaluation may comprise testing and validating the fix to determine if the rule or policy should be made available to all administrators under that level's jurisdiction. If the administrator at that level approves the fix, the rule or policy is published (made available to all administrators) in that level's jurisdiction. The approval may specify that the rule or policy is mandatory for all applicable resources under that level's jurisdiction or it may be available for optional use by the administrators in that jurisdiction. In addition, when the rule or policy is approved at that level, the approved rule or policy is then nominated to the next higher level in the hierarchy, and so on. In this manner, contributions by individual administrators at any level of a policy hierarchy may be evaluated and leveraged more widely throughout an enterprise.

Each rule or policy nomination throughout the hierarchy may also comprise information indicating the relative worth of a nominated rule or policy. This relative worth information is used to provide objective and subjective information to higher level administrators who may not know or are unable to obtain the specific details of a rule or policy. The information may include information regarding how many administrators are using the rule or policy, how the administrators rate the policy in a subjective ranking, what the risk assessment is of implementing or not implementing the policy, the enterprise-wide adoption rate of rules or policies previously created and/or nominated by administrators handling the policy until that point, and how many outstanding trouble tickets would be handled by implementing the policy. The relative worth information may also be used to determine if an approved policy should be defined as mandatory or optional.

The policy management system also allows rules to be automatically grouped into one or more policies. Grouping rules into policies enables administrators to perform a collection of related administrative actions simultaneously, rather than having to perform the actions specified in the rules individually. Thus, instead of having to manually add rules to a policy, the policy management system allows rules to be automatically included into one or more policies. As a result, an administrator may manage the policies, rather than manage the individual rules.

Rules are automatically grouped into policies based on pre-established criteria and rule attributes. A rule attribute is any searchable characteristic of a rule, such as for example the particular server operating system version to which the rule applies. A rule attribute may be defined at the time the rule is created, inherited from a policy of which the rule is a member, or inherited from a profile with which the rule (or policy) is associated. A profile is a collection of servers that are grouped together by an administrator, as described in co-pending U.S. patent application Ser. No. 11/422,225, filed Jun. 5, 2006, which is hereby incorporated by reference. Rule attributes may be set or overridden per association with a particular profile or server. Rule attributes may also be changed at the time the rule is modified.

Policy criteria are established by the author of the policy. Policy criteria may be established as static or dynamic, permitting rules to be aggregated into static policies or dynamic policies. In a static policy, an administrator selects the individual rules that will comprise the policy. In a dynamic policy, an administrator establishes a set of criteria that is used to identify those rules having attributes which match the criteria and thus may be included in the policy.

As new rules are created, these rules may be automatically added to existing policies. In addition, modifying a rule may change those policies of which the rule is a member. Thus, before new rules are automatically added to a policy or a modified rule is allowed to remain in a policy, a conflict check is performed on the rules to ensure that the policy will remain consistent after the addition or modification, and that the different rules in the policy do not conflict with each other. If conflict errors are detected, the errors may be reported to the administrator, the governing mechanism of the service delivery center, and to the author of the rule. The offending rules may also be automatically removed from the policy.

Turning now to FIG. 3, an exemplary block diagram comprising components used for managing policies in accordance with the illustrative embodiments is shown. In this illustrative example, data processing system 300 comprises administrative server 302 and a plurality of servers (server 304, server 306, server 308, and server 310) managed by a local administrator. Administrative server 302 houses an administrative application for performing remote management actions on servers 304-310.

Administrative server 302 also comprises rules 312 and polices 314. Rules 312 comprise defined behaviors of servers in the enterprise, and may be created and modified by an administrator. Rules are an abstract concept and are language/run-time independent. Examples of such language independent rules include scripts, cfengine rules, Tivoli policies, and other configuration and management meta-languages. Rules typically have three parts: prep \u2013 run on a server before deployment to the managed server; exec \u2013 run on the managed server by an agent which forces any constraints; and import \u2013 run on the server to import/process any results from execution including tag modifications and/or database operations. Rules also may have multiple executions modes selectable by an administrator and/or by a policy. For example, these mode include check, apply, remediation (e.g., fix a reported failure), and automate (e.g., auto-apply the script as necessary).

Each policy in policies 314 comprises a set of rules and defines the behavior of one or aspects of the system. Policies may be defined by outcome, such as an action policy which defines an operation to be performed, a goal policy which defines a state that must be achieved and maintained but does not specify how it is to be accomplished, a result policy which defines a value or a set of values, and a configuration policy which defines an intended configuration. Some examples of policies are listed in Table 1 below:

TABLE 1

The customer database must be backed up nightly between 1 a.m. and 3 a.m.
Gold customers are to receive no worse than 1-second average response times on all purchase transactions
Only management and the HR staff can access personnel records
The number of connections requested by the Web application server cannot exceed the number of connections supported by the associated database Policies 314 may also be associated with one or more profiles, which comprise configuration settings and other data which represent distinctive features or characteristics of a group of servers, as described in co-pending U.S. patent application Ser. No. 11/422,225, filed Jun. 5, 2006.

An administrator may manage servers 304-310 via administrative interface 316. The illustrative embodiments are not limited to a specific interface embodiment; rather, any interface that allows an administrator to manage and propagate rules and policies in a policy hierarchy may be used. Via administrative interface 316, the administrator may create and define rules and policies to apply to servers 304-310. The administrator may also nominate the policy for global use. For example, upon creating a policy, the administrator may nominate the policy by selecting a "global" checkbox provided in administrative interface 316.

Administrative server 302 also comprises rule attributes 318. Rule attributes 318 includes any searchable information about a rule. Administrative server 302 uses search criteria specified in policies 314 and rule attribute information 318 to determine which of rules 312 may be grouped together in a policy. As changes are made to attributes of a rule, the administrative server may automatically move the rule into, out of, or between policies. For example, if changes occur to an existing rule or a new rule is created, the rule may automatically be included in or removed from one or more policies based upon the attributes of the rule.

When the administrator creates a policy by setting up attribute criteria via the administrative interface, the administrator may also set the policy membership to be fully automated or semi-automated. For example, if the policy membership is fully automated, when administrative server 302 determines from the search criteria and rule attribute information that a rule may be added to a policy, the administrative server may automatically assign the rule to the policy. If the policy membership is semi-automated, rather than automatically assigning the rule to the policy, the administrative server makes a suggestion to the administrator that the rule is a candidate for addition to the policy. The administrative server then waits for the administrator to approve the change before assigning the rule to the policy.

Furthermore, rules 312 and policies 314 may be run on an administrator-defined schedule. This schedule may be overridden on a per-policy, per-profile, per-server, or per-association basis.

FIG. 4 is a diagram illustrating an exemplary jurisdictional hierarchy through which rules and polices are nominated for promotion in accordance with the illustrative embodiments. Jurisdictional hierarchy 400 is used to structure policy engines in the enterprise in order to govern how administrative actions are carried out at an enterprise level. Jurisdictional hierarchy 400 may be employed in a service delivery environment such as, for example, International Business Machines™ (IBM™) Global Delivery Centers. A service delivery environment may manage multiple sites for a company and also may manage multiple sites for multiple corporations. For each organization, there may be many different practices and regulations, so each organization may have different approval processes and standards committees.

For purposes of illustration, a jurisdictional hierarchy 400 is provided which comprises multiple levels of authority within a service delivery organization. At the lowest level 402 are local administrators. The local administrators may control a number of servers. Above the local administrators are administrators for the particular site 404. The site administrators have authority over a larger number of servers associated with a specific site. Above the site administrators are administrators for the particular company 406. These administrators have authority over servers for a particular company, such as Microsoft™, whose servers are being managed by the IBM™ Global Delivery Center. Above the administrators for a particular company are administrators for a particular geographic region 408. These administrators have authority over servers for multiple organizations for a region, such as, for example, North America. Above the administrators for the geographic region are global administrators 410. Global administrators 410 have authority over the entire service delivery organization. The example described above is not meant to be limiting. Administrators may be organized hierarchically using any other methods.

Within this example, when a local administrator 402A develops a fix or solution, the local administrator may nominate that policy for global use. Through the nomination, the rule or policy is made visible to the next higher level (in this case, site administrator 404A) in the jurisdictional hierarchy. Upon receiving the nomination, site administrator 404A reviews and evaluates the policy. If site administrator 404A approves the policy, the policy is then made available to all administrators under site administrator's 404A jurisdiction, including local administrators 402A, 402B, and 402C. The approved policy may also be nominated by site administrator 404A to the next higher level in the hierarchy, or company administrator 406A, for review and evaluation. This process may be repeated as the rule or policy is propagated up through the jurisdictional hierarchy. In the example above, any administrator may develop a rule or policy for use by other administrators. For instance, administrator 404A may create a rule or policy, recommend or mandate its use by administrators 402A-402C, and nominate it for adoption elsewhere.

Figure 5:
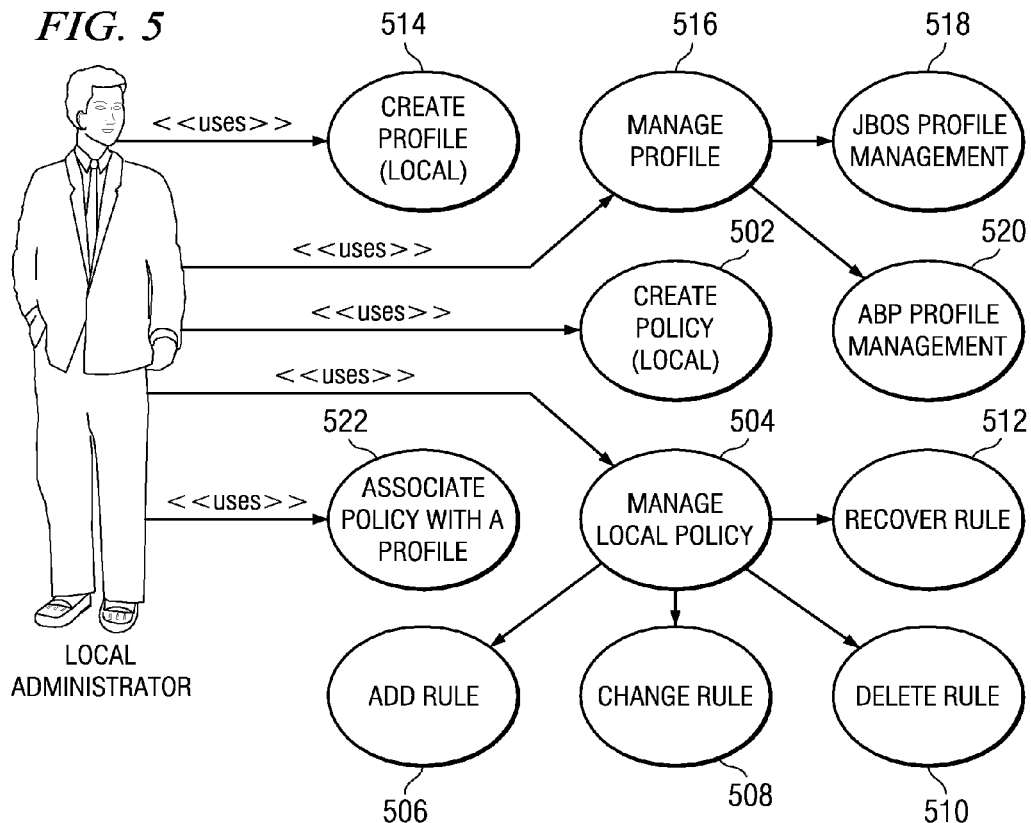
FIG. 5 is an exemplary block diagram illustrating a local administrator's view in accordance with the illustrative embodiments.

FIG. 5 is an exemplary block diagram illustrating a local administrator's view in accordance with the illustrative embodiments. A local administrator, such as a local administrator in bottom level 402 in FIG. 4, may perform local policy management, such as creating a local policy 502 or managing a local policy 504. The local administrator may manage policies via an administrative interface, such as administrative interface 316 in FIG. 3. Local policy management may include subtasks, such as adding a rule to a policy 506, changing a rule in a policy 508, removing a rule from a policy 510, or recovering a rule 512.

In addition, a local administrator may create a local profile 514 and manage a profile 516 via administrative interface 316 in FIG. 3. Profile management may include JBOS (Just a Bunch Of Servers) profile management 518, which includes the subtasks of adding a server to a profile, removing a server from a profile, and listing all servers in the profile. Profile management may also include ABP (Attribute-Based Profile) management 520, which is built upon expressions comprising an attribute, a logical operator, and a value. ABP management includes the subtasks of adding an expression to a profile, removing an expression from a profile, and evaluating a profile on a server, such as determining if the server applies to an attribute-based profile. Profiles may be constructed as the union or intersection of multiple parent profiles. Profiles may also in inherit parent profile attributes, parameters, or members.

As previously mentioned, the local administrator may also associate a policy with a profile 522. A policy is associated with a profile in order to make a policy active on a set of servers grouped together in the profile. As part of the association, the local administrator may customize part of the association, such as customizing the scheduling information for the policy, the acceptance level to implement the policy (e.g., warning, manual approval, or automatic approval), or by overriding default parameters defined in the policy. For example, profile XYZ may comprise a set of servers (e.g., X, Y, and Z) having like server attributes. The profile XYZ may be associated with a policy, such as a policy for managing MP3 files containing the following rules listed in Table 2 below:

TABLE 2

I do not want any MP3 files on my server
I want to give one warning to the user via email
After one week, I want to notify the user's manager
After two weeks, delete all of the MP3 files
For the next 6 months, delete any new MP3 files When the MP3 policy is associated with the XYZ profile, the server profile automatically accepts all of the rules listed in the policy and executes or undertakes the actions specified by the rules in the policy. Policy variables within a policy and policy constraints may also be associated with a profile.

Figure 6:
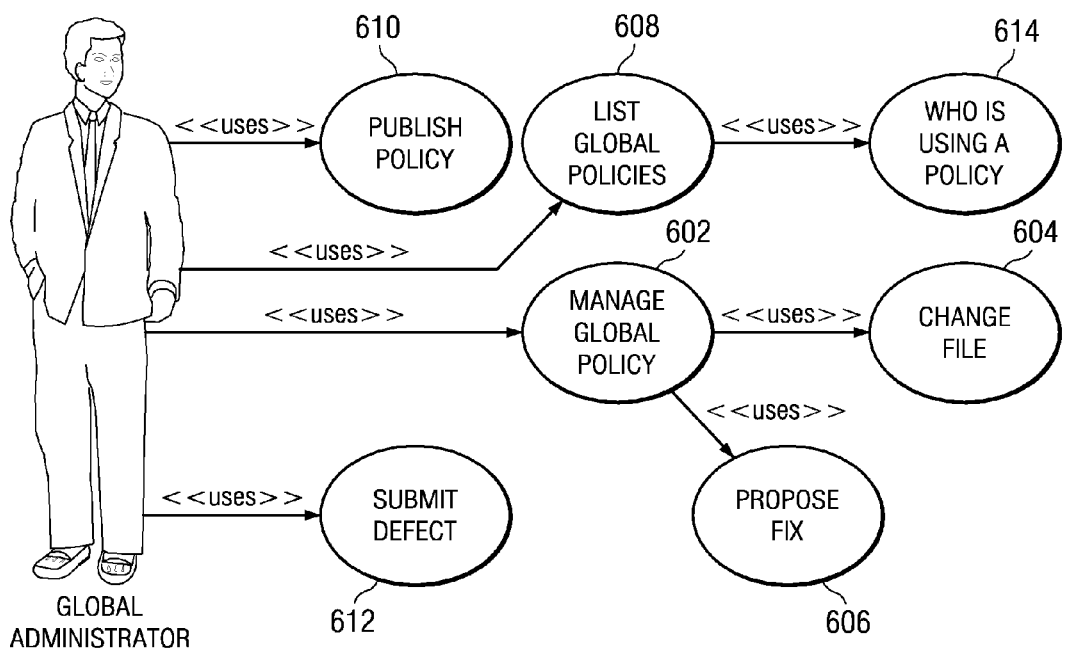
FIG. 6 is an exemplary block diagram illustrating a global administrator's view in accordance with the illustrative embodiments.

FIG. 6 is an exemplary block diagram illustrating a global administrator's view in accordance with the illustrative embodiments. An administrator, such as an administrator in upper levels 404, 406, 408, and 410 in FIG. 4, may manage global policies 602. The administrator may change files 604 in a global policy and use the files locally. The administrator may also propose a fix with the changes for other administrators to review (and potentially use) 606. However, it may be essential to require that only the owner of the policy accept the policy change and make the policy change global.

The administrator may also list the global policies 608, publish policies 610, and submit defects to a policy 612. For each policy in the list, the accounts using the policy and the respective versions of the policy are provided to the administrator 614. Policies in the list may be searched for using filters and tags in the policies. By publishing a policy, the policy is made public and available to other accounts or administrators. A defect may be submitted to a policy to notify the policy owner about a problem or a request for change, or to notify others who use or want to use the policy.

FIG. 7 illustrates a sample extensible markup language (XML) file defining rule elements and their corresponding values in accordance with the illustrative embodiments. As shown, XML file 700 specifies name, declaration, description, parameters, and resource values for a rule, as well as the values for the rule's parameters and resources.

FIG. 8 is a flowchart of a process for policy-based management of resources in a service delivery environment in accordance with the illustrative embodiments. The process begins with an administrator creating a rule or policy (step 802). The administrator may be any administrator in the enterprise. The administrator then nominates the rule or policy for global use by propagating the nomination to the next higher level of the jurisdictional hierarchy for evaluation (step 804). In the next higher level of the policy hierarchy, the policy nomination is evaluated according to the processes and bylaws of that hierarchy's jurisdiction (step 806). If the policy nomination is not approved ("no" output of step 808), the process terminates thereafter.

If the policy nomination is approved ("yes" output of step 808), the nominated policy is published or made available to all other administrators under that level's jurisdiction (step 810). Once a policy is made available to other administrators, the rule or policy may be incorporated into other policies within that jurisdiction. That level may then nominate the policy to the next higher level in the jurisdictional hierarchy for evaluation and publication to that higher level jurisdiction (step 812).

FIG. 9 is a flowchart of a process for aggregating rules into policies in accordance with the illustrative embodiments. The process begins with the administrator logging into the administrative server via a Web-based administrative interface (step 902). For instance, the administrator may log into administrative server 302 using administrative interface 316 in FIG. 3. The administrator may then select an option in the administrative interface to create a new policy (step 904). Upon selecting the option to create a new policy, the administrator may enter attribute criteria for the policy (step 906) which specifies the criteria for inclusion of a rule into the policy. The administrator may then designate the policy to be fully automatic or semi-automatic (step 908). If the policy is fully automatic, the administrative server may transparently move rules in and out of the policy based on the rules' attributes without prompting the administrator for approval (step 910). If the policy is semi-automatic, the administrative server provides suggestions to the administrator to move eligible rules, and those rules are only moved in and out of policies upon administrator approval (step 912).

Figure 10:
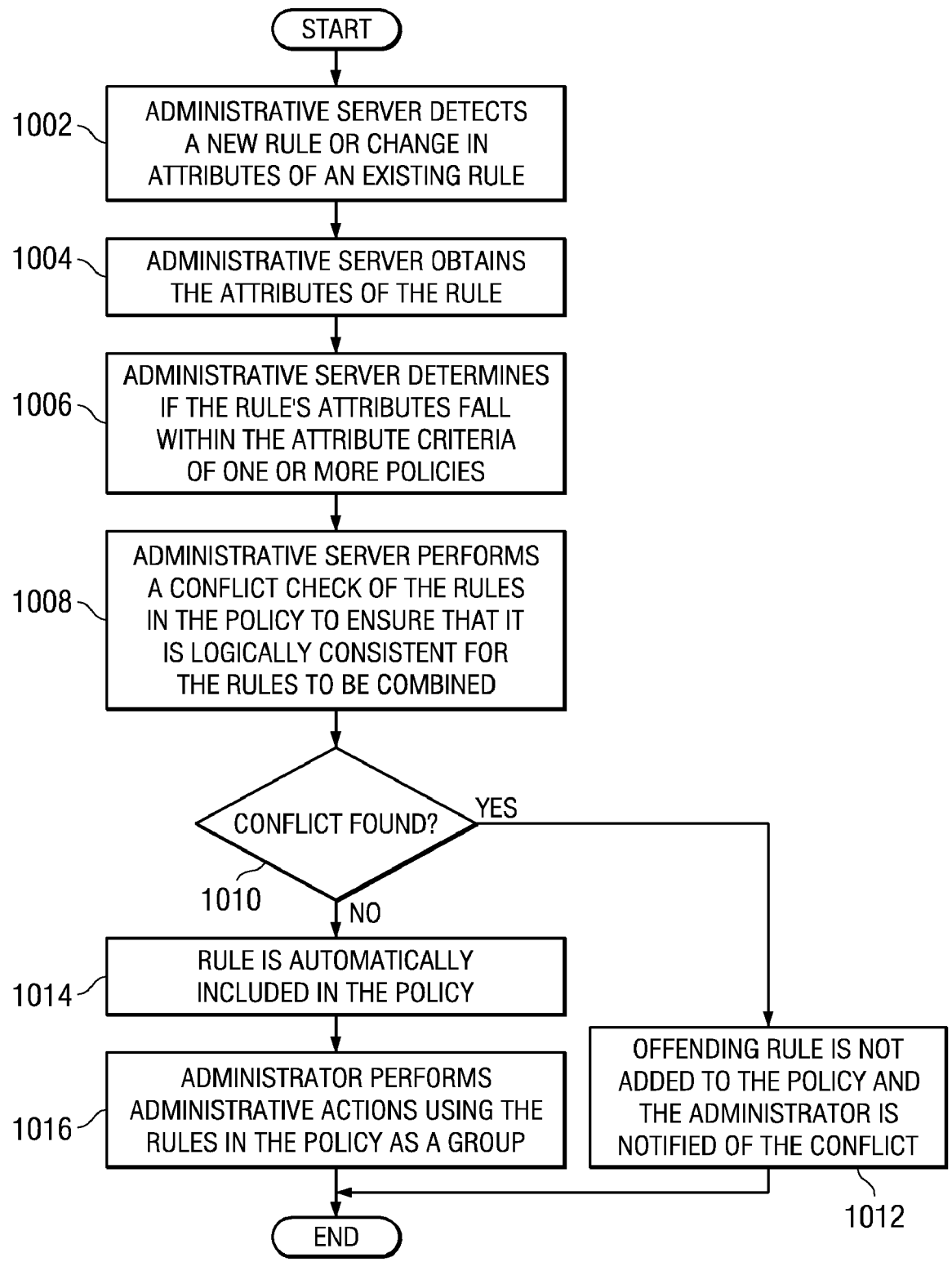
FIG. 10 is a flowchart of a process for automatically aggregating rules into policies in accordance with the illustrative embodiments.

FIG. 10 is a flowchart of a process for automatically aggregating rules into policies in accordance with the illustrative embodiments. The process begins with the administrative server detecting a new rule or a change in attributes of an existing rule (step 1002). The administrative server obtains the attributes of the rule (step 1004). The administrative server then determines if the rule's attributes fall within the attribute criteria of one or more policies (step 1006). If the rule's attributes fall within the attribute criteria of a policy, the administrative server performs a conflict check of the rules in the policy to ensure that it is logically consistent for the rules to be combined (step 1008). In other words, since each rule carries conditions under which it can be applied, the rules in the policy are checked for conflicts to ensure that the policy will remain consistent if the new rule is included.

If a conflict is found ("yes" output of step 1010), the offending rule is not added to the policy, and the administrator is notified of the conflict (step 1012), with the process terminating thereafter. The governing mechanisms in the service delivery center and the author of the rule may also be notified as well. If no conflict is found ("no" output of step 1010), the rule is automatically included into the policy (step 1014). If the rule was previously assigned to a policy but now no longer falls within that policy, the administrative server may also automatically remove the rule from that policy. The administrator may now perform administrative actions using the rules in the policy as a group (step 1016).

FIG. 11 is a flowchart of a process for semi-automatically aggregating rules into policies in accordance with the illustrative embodiments. The process begins with the administrator logging into the administrative server via a Web-based administrative interface (step 1102). For instance, the administrator may log into administrative server 302 using administrative interface 316 in FIG. 3. Upon log in, the administrative interface provides rule candidates that are eligible to be added to or removed from policies to the administrator (step 1104). A rule candidate is deemed eligible for inclusion into a policy upon determining that no conflicts exist between the candidate rule and the existing rules in the policy. The administrator is provided with the option to approve or disapprove of the suggestions from the administrative server (step 1106). A determination is then made as to whether the administrator approved the suggestion (step 1108). If the administrator approves of a suggestion ("yes" output of step 1108), the administrative server performs the suggested action (step 1110). The administrator may now perform administrative actions using the rules in the policy as a group (step 1112). If the administrator disapproves of the suggestion ("no" output of step 1108), the administrative server takes no action and the rule candidates are not added to or removed from the policy (step 1114).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or non-transitory computer-readable medium providing program code for use by or in connection with a computer or any instruction execution system. For the purposes of this description, a computer-usable or non-transitory computer-readable medium can be any tangible apparatus that can contain and store the program for use by or in connection with the instruction execution system, apparatus, or device.

A non-transitory computer-readable medium can include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for distributing rules and policies in a jurisdictional hierarchy, the computer implemented method comprising: creating a rule or policy at a level in a jurisdictional hierarchy, wherein the jurisdictional hierarchy comprises a plurality of administrative authority levels within an organization, wherein the jurisdictional hierarchy is implemented within a service delivery environment; nominating the rule or policy for inclusion in a next higher level in the jurisdictional hierarchy, wherein a rule or policy nomination includes information indicating a relative worth of the rule or policy, wherein the relative worth information includes at least one of a subjective ranking of the rule or policy, a number of administrators currently using the rule or policy, an enterprise-wide adoption rate of rules or policies previously created or nominated by administrators handling the policy until that point, a risk assessment of implementing or not implementing the rule or policy, or a number of outstanding trouble tickets handled by implementing the rule or policy; evaluating, by a processing unit of the data processing system, the rule or policy at the next higher level according to processes and bylaws of the next higher level's jurisdiction: responsive to an approval of the next higher level to include the rule or policy in a jurisdiction of the next higher level, providing, by the processing unit, the rule or policy to all users under the jurisdiction; and repeating the nominating, evaluating, and providing steps for each higher level in the jurisdictional hierarchy.

2. The computer implemented method of claim 1, wherein the rule or policy is created by an administrator at a bottom level of the jurisdictional hierarchy.

3. The computer implemented method of claim 1, wherein the approval specifies that the rule or policy is either mandatory or optional.

4. The computer implemented method of claim 1, wherein the creating step further comprises:
establishing a set of criteria in the policy, wherein the criteria defines rule attributes necessary for automatic inclusion of a rule in the policy.

5. The computer implemented method of claim 4, further comprising:
identifying a rule having rule attributes which meet the set of criteria specified in the policy;
performing a conflict check to determine if inclusion of the rule results in a conflict with another rule in the policy; and
responsive to a determination that no conflict exists, automatically adding the rule to the policy.

6. The computer implemented method of claim 4, wherein rule attributes are associated with a rule by one of a user tagging a rule with rule attributes, inheritance of rule attributes from a policy of which the rule is a member, or inheritance of rule attributes from a profile with which the rule is associated.

7. The computer implemented method of claim 4, wherein rule attributes are set or overridden per association with a particular profile or server.

8. The computer implemented method of claim 5, wherein the step of adding the rule to the policy is performed automatically or semi-automatically.

9. The computer implemented method of claim 8, further comprising:
if the step of adding the rule is performed automatically, transparently adding the rule without prompting for user approval.

10. The computer implemented method of claim 8, further comprising:
if the step of adding the rule is performed semi-automatically, providing a suggestion to a user of rules eligible to be added to the policy, and adding the eligible rules only upon receiving user approval.

11. The computer implemented method of claim 5, further comprising:
associating a profile to the policy.

12. The computer implemented method of claim 5, wherein rules are moved among policies as the rules' attributes change.

13. The computer implemented method of claim 5, wherein a rule is a member of one of zero, one, or more policies.

14. A data processing system for distributing rules and policies in a jurisdictional hierarchy, the data processing system comprising: a bus; a storage device connected to the bus, wherein the storage device contains computer usable code; at least one managed device connected to the bus; a communications unit connected to the bus; and a processing unit connected to the bus, wherein the processing unit executes the computer usable code to create a rule or policy at a level in a jurisdictional hierarchy, wherein the jurisdictional hierarchy comprises a plurality of administrative authority levels within an organization, wherein the jurisdictional hierarchy is implemented within a service delivery environment, nominate the rule or policy for inclusion in a next higher level in the jurisdictional hierarchy, wherein a rule or policy nomination includes information indicating a relative worth of the rule or policy, wherein the relative worth information includes at least one of a subjective ranking of the rule or policy, a number of administrators currently using the rule or policy, an enterprise-wide adoption rate of rules or policies previously created or nominated by administrators handling the policy until that point, a risk assessment of implementing or not implementing the rule or policy, or a number of outstanding trouble tickets handled by implementing the rule or policy, evaluate the rule or policy at the next higher level according to processes and bylaws of the next higher level's jurisdiction, provide the rule or policy to all users under a jurisdiction of the next higher level in response to an approval of the next higher level to include the rule or policy in the jurisdiction, and repeat the nominating, evaluating, and providing steps for each higher level in the jurisdictional hierarchy.

15. A computer program product for distributing rules and policies in a jurisdictional hierarchy, the computer program product comprising: a non-transitory computer-readable medium having computer usable program code stored thereon, the computer usable program code comprising: computer usable program code for creating a rule or policy at a level in a jurisdictional hierarchy, wherein the jurisdictional hierarchy comprises a plurality of administrative authority levels within an organization, wherein the jurisdictional hierarchy is implemented within a service delivery environment; computer usable program code for nominating the rule or policy for inclusion in a next higher level in the jurisdictional hierarchy, wherein a rule or policy nomination includes information indicating a relative worth of the rule or policy, wherein the relative worth information includes at least one of a subjective ranking of the rule or policy, a number of administrators currently using the rule or policy, an enterprise-wide adoption rate of rules or policies previously created or nominated by administrators handling the policy until that point, a risk assessment of implementing or not implementing the rule or policy, or a number of outstanding trouble tickets handled by implementing the rule or policy; computer usable program code for evaluating the rule or policy at the next higher level according to processes and bylaws of the next higher level's jurisdiction; computer usable program code for providing the rule or policy to all users under a jurisdiction of the next higher level in response to an approval of the next higher level to include the rule or policy in the jurisdiction; and computer usable program code for repeating the nominating, evaluating, and providing steps for each higher level in the jurisdictional hierarchy.

16. The computer program product of claim 15, wherein the rule or policy is created at a bottom level of the jurisdictional hierarchy.

* * * * *